C. H. T. ALSTON.
INTERNAL COMBUSTION ENGINE.
APPLICATION FILED MAR. 1, 1918.

1,335,952.

Patented Apr. 6, 1920.
2 SHEETS—SHEET 1.

Inventor:
Charles Henry Thomas Alston
by Foster Freeman Watson & Cort
Attys

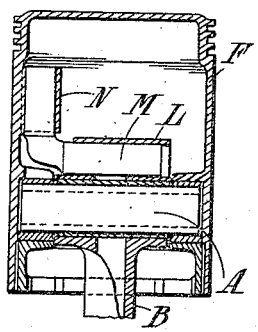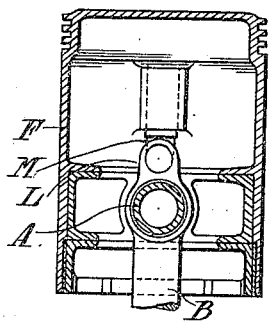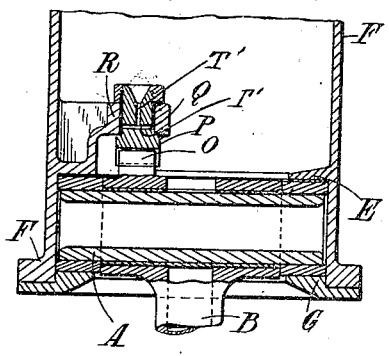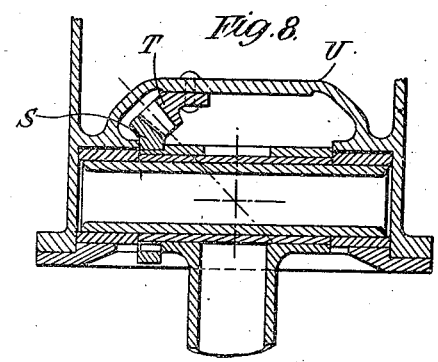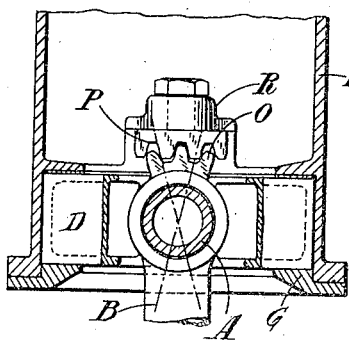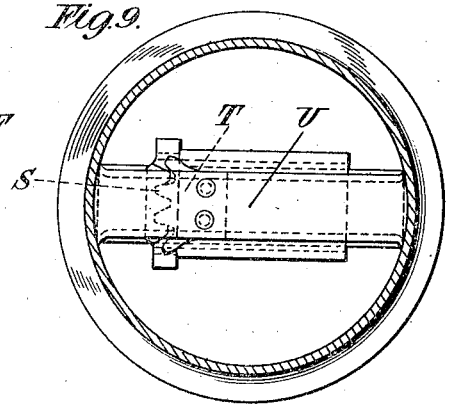

UNITED STATES PATENT OFFICE.

CHARLES HENRY THOMAS ALSTON, OF STIRLING, SCOTLAND, ASSIGNOR TO ALPHAERO ENGINES (FOREIGN PATENTS) LIMITED, OF LONDON, ENGLAND.

INTERNAL-COMBUSTION ENGINE.

1,335,952.    Specification of Letters Patent.    Patented Apr. 6, 1920.

Application filed March 1, 1918. Serial No. 219,941.

*To all whom it may concern:*

Be it known that I, CHARLES HENRY THOMAS ALSTON, a subject of the King of England, residing at Stirling, Scotland, have invented certain new and useful Improvements in Internal-Combustion Engines, of which the following is a specification.

This invention is for improvements in or relating to internal combustion engines and has for its object to provide an engine of the type in which the working piston uncovers ports in the cylinder by a turning as well as a reciprocating movement.

According to this invention, the engagement between the gudgeon-pin for the small end of the connecting-rod and the piston is characterized by the bearings for the ends of the gudgeon-pin being so mounted in the piston that although they reciprocate as one with it, the piston can turn relatively to the said bearings; and an extension is provided on the small end of the connecting-rod to operatively connect with the piston and effect the turning movement of the latter.

Preferably the bearings are formed in a ring which is engaged between shoulders in the open end of the piston, one of which shoulders may be constituted by a removable part, for example a ring screwed into the open end of the piston, and various forms of mechanism may be provided for connecting the extension of the connecting-rod with the piston, so as to impart the desired angular movement to the latter relatively to the said bearings.

Four constructions according to this invention are illustrated in the accompanying drawing, in which:—

Figs. 4 and 5 are sections similar to Figs. 1 and 2, and show a second method of imparting the angular movement to the piston.

Figs. 6 and 7 are respectively similar sections showing a third method, and

Figs. 8 and 9 are respectively a vertical and horizontal section showing a fourth method.

The gudgeon-pin A for the connecting-rod B is carried in bearings C formed on a ring D. The ring D is rotatable between a shoulder E solid with the piston F, and a removable shoulder G connected to the piston in any suitable manner. Such a connection between the connecting-rod and the piston is shown in all the figures of the drawings, but four methods are shown for imparting the desired angular movement to the piston relatively to the gudgeon-pin bearings.

Figure 1:
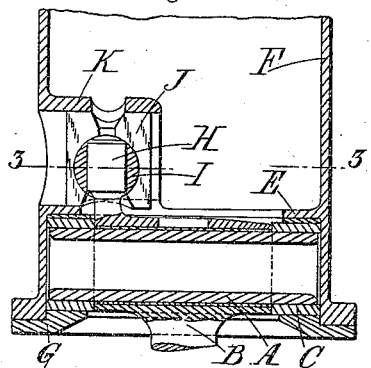
Figure 1 is a vertical section through part of a piston and passing longitudinally through the gudgeon-pin.
Figure 2:
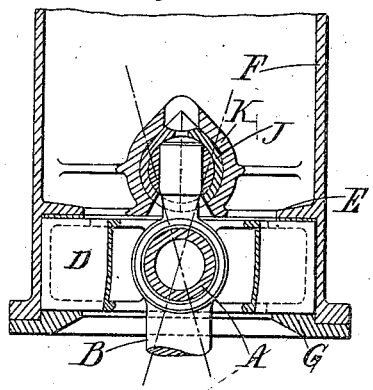
Fig. 2 is a vertical section at a right-angle to Fig. 1.
Figure 3:
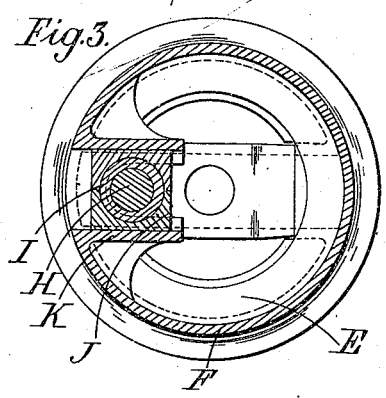
Fig. 3 is a transverse section on the line 3—3 in Fig. 1.

In Figs. 1, 2 and 3, an extension H is provided on the connecting-rod B and projects along a line parallel to the connecting-rod but to one side thereof. This extension is cylindrical and fits a correspondingly shaped orifice in a block which comprises a ball I rotatably mounted in a split sliding bearing J. The sliding bearing J is carried in a pocket K formed on the inner wall of the piston and although slidable therein, it does not rotate.

In Figs. 4 and 5 the extension L of the connecting-rod B has a hole therethrough parallel to the gudgeon-pin, and a pin M is slidably and rotatably mounted in said hole. One end of the pin extends to engage rotatably and slidably in a guide N formed longitudinally on the inner wall of the piston F.

In Figs. 6 and 7 the extension of the connecting-rod B has a toothed sector O formed on the end, which sector engages a toothed rack P carried on a pin Q rotatably mounted in a bracket R formed on the inner wall of the piston F. Lubricating ducts T' are formed in the pin Q.

The flange shown at the bottom of the piston in all figures but 4 and 5 is employed to provide an annular pumping face in certain forms of two-stroke internal combustion engines. In applying the invention to an ordinary piston, the flange is absent as shown in Figs. 4 and 5.

Another method of employing a toothed sector is to give the latter the contour of a bevel wheel S (see Figs. 8 and 9) and engage this with the teeth of a coöperating bevel-wheel element T carried within the piston. The element T is supported within the piston on a bridge-piece U.

In some cases it may be advantageous to employ the turning movement without requiring that the piston uncover ports, as by this means friction and wear are reduced.

What I claim as my invention and desire to secure by Letters Patent is:—

1. In an internal combustion engine in which the piston uncovers ports in the cylinder by both a turning and a reciprocating movement, the combination of a gudgeon pin; bearings for said pin; a piston axially rotatable on said bearings but adapted to reciprocate therewith; a connecting rod on said pin; said rod having an extension beyond the pin; and means to operatively connect the extension to the piston for effecting the turning movement of the latter.

2. In an internal combustion engine in which the piston uncovers ports in the cylinder by both a turning and a reciprocating movement, the combination of a gudgeon pin, a ring adapted to rotate in a recess in the interior of the piston and carrying bearings for the gudgeon pin; a second ring secured in the open end of the piston to retain the first named ring in position; a connecting rod on said pin; said rod having an extension beyond the pin; and means to operatively connect the extension to the piston for effecting the turning movement of the latter.

3. In an internal combustion engine in which the piston uncovers ports in the cylinder by both a turning and a reciprocating movement, the combination of a gudgeon pin; bearings for said pin; a piston axially rotatable on said bearings but adapted to reciprocate therewith; a connecting rod on said pin; a cylindrical extension on the connecting rod parallel to and to one side of said rod; a pocket on the inner wall of the piston; a bearing slidable in the pocket but unable to rotate therein; and a ball rotatably mounted in the bearing and adapted to receive the cylindrical extension which can both turn and slide in the ball.

In testimony whereof I have signed my name to this specification.

CHARLES HENRY THOMAS ALSTON.